US012069771B1

(12) United States Patent
Tchakarov et al.

(10) Patent No.: US 12,069,771 B1
(45) Date of Patent: Aug. 20, 2024

(54) DATA COLLECTION SYSTEM AND METHOD OF USE

(71) Applicants: Vassil Tchakarov, Houston, TX (US); Wendy Runyon-Ricker, Houston, TX (US)

(72) Inventors: Vassil Tchakarov, Houston, TX (US); Wendy Runyon-Ricker, Houston, TX (US)

(*) Notice: Subject to any disclaimer, the term of this patent is extended or adjusted under 35 U.S.C. 154(b) by 693 days.

(21) Appl. No.: 17/180,303

(22) Filed: Feb. 19, 2021

(51) Int. Cl.
B62B 1/26 (2006.01)
B62B 1/00 (2006.01)
H04W 84/18 (2009.01)

(52) U.S. Cl.
CPC .............. H04W 84/18 (2013.01); B62B 1/00 (2013.01); B62B 1/26 (2013.01)

(58) Field of Classification Search
CPC ............. H04W 84/18; B62B 1/00; B62B 1/26
See application file for complete search history.

(56) References Cited

U.S. PATENT DOCUMENTS 8,972,061 B2 3/2015 Rosenstein
10,308,266 B2* 6/2019 Cook ..................... B62B 1/14
2020/0047780 A1* 2/2020 Marichal ............ B61L 23/045
2021/0405646 A1* 12/2021 Park .................... G05D 1/0234

FOREIGN PATENT DOCUMENTS

CN 103532744 B 6/2016
CN 104787635 B 2/2017
CN 105612430 B 1/2019

* cited by examiner

Primary Examiner — John D Walters
(74) Attorney, Agent, or Firm — Richard Eldredge; Eldredge Law Firm

(57) ABSTRACT

A data collection system includes a cart to carry one or more data collection devices, the cart having a body with a top surface; a first compartment cut through a thickness of the body, the first compartment to receive a first data collection device; and an opening to receive a handle, the handle can be used to maneuver the cart; a computing device in wireless communication with the first data collection device; the computing device receives data from the first data collection device, the data related to a floor surface.

9 Claims, 4 Drawing Sheets

DATA COLLECTION SYSTEM AND METHOD OF USE

BACKGROUND

1. Field of the Invention

The present invention relates generally to floor data collection systems, and more specifically, to a data collection system for collecting and analyzing data regarding a floor.

2. Description of Related Art

Data collection systems are well known in the art and are effective means to analyze information. For example, data and information may be collected through visual inspection of an area, such as a floor, wherein the data is used for analysis. such as for inspections.

One of the problems commonly associated with conventional data collection systems is limited use. For example, the visual inspection may only provide limited information on which decisions are made.

Accordingly, although great strides have been made in the area of data collection, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
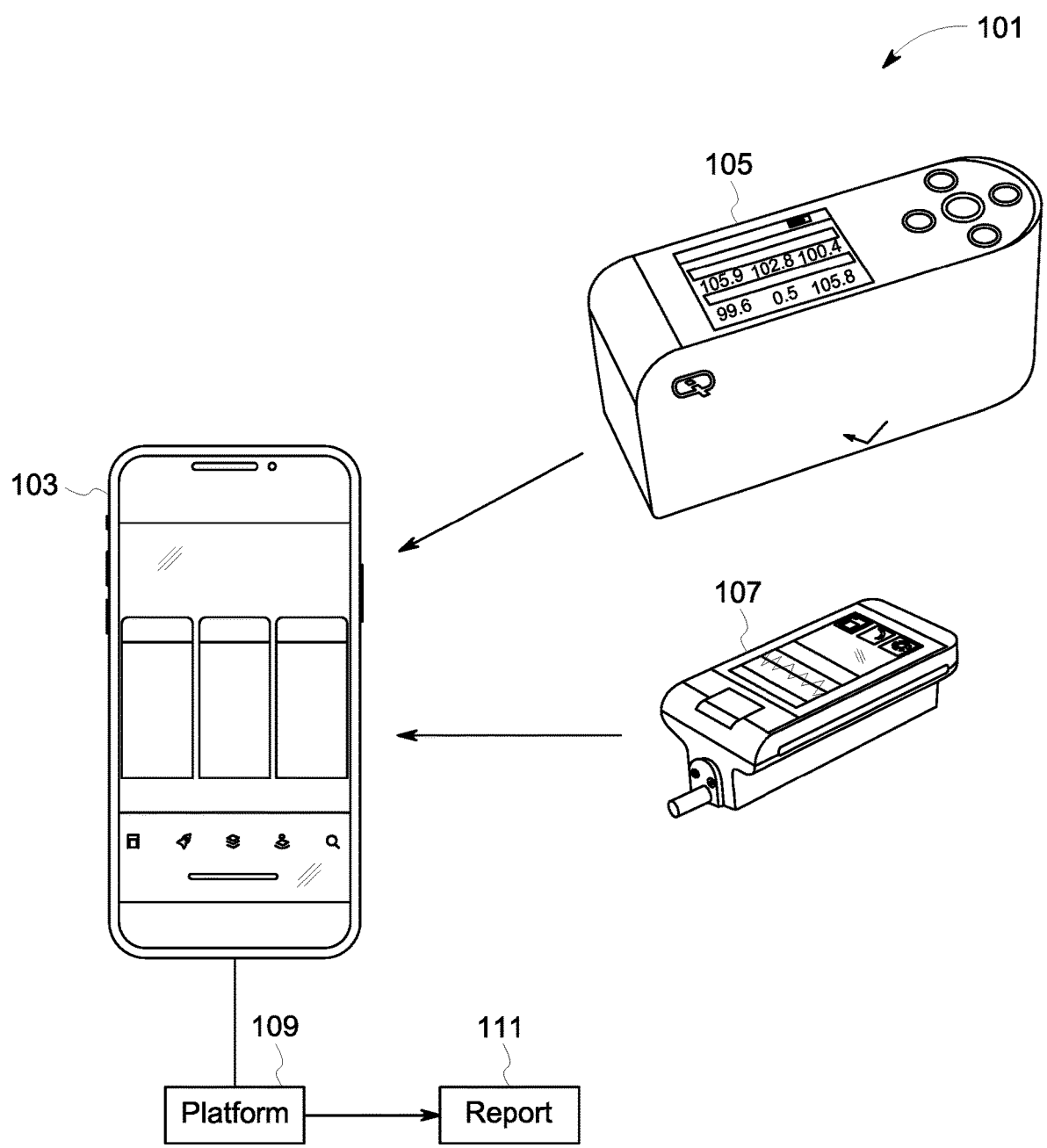
FIG. 1 is a schematic of a data collection system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional data collection systems. Specifically, the system of the present invention provides for data collection via one or more devices for transmittal to a computing device, wherein a report is generated. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic of a data collection system 101 in accordance with a preferred embodiment of the present application. It will be appreciated that system 101 overcomes one or more of the above-listed problems commonly associated with conventional data collection systems.

Figure 3:
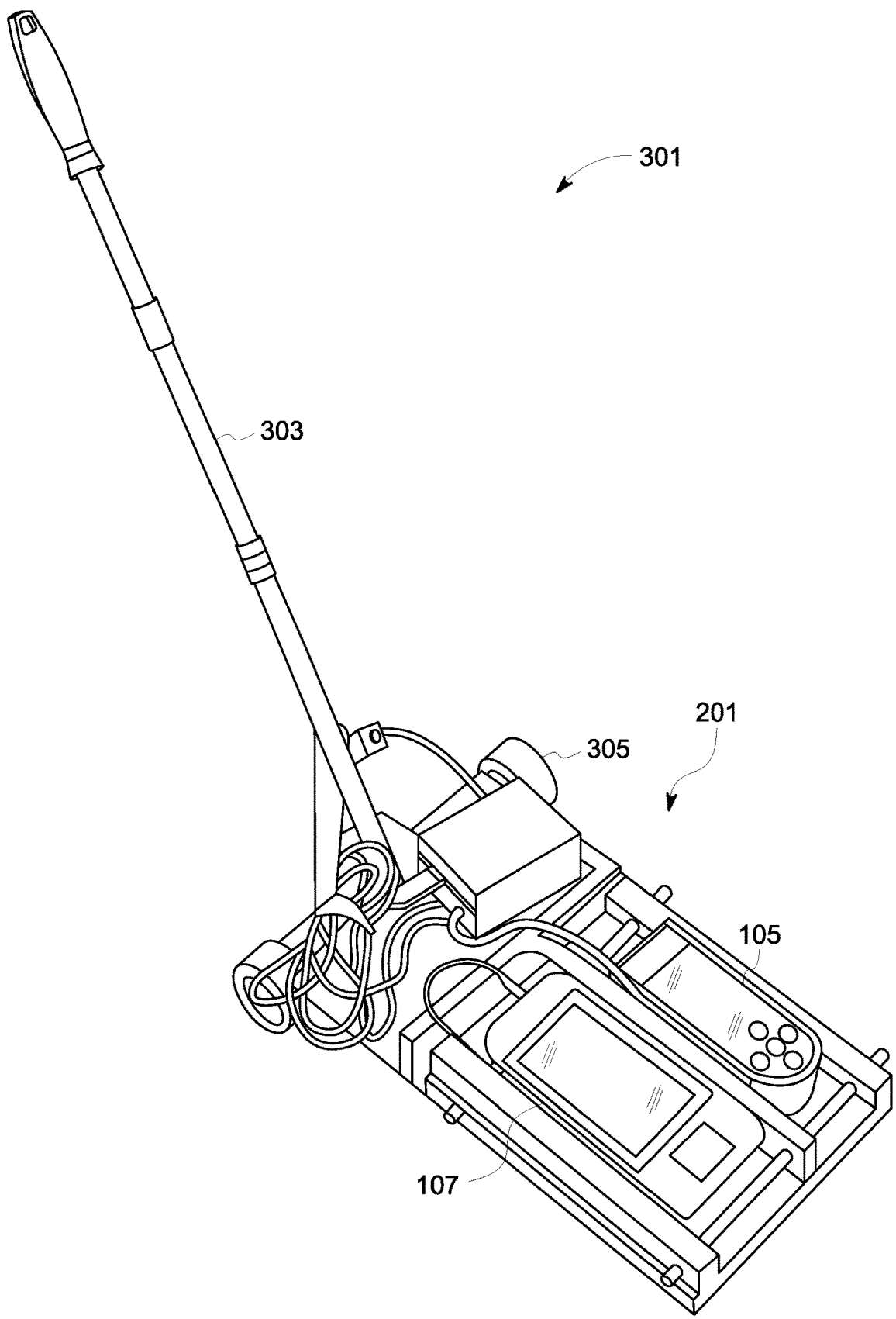
FIG. 3 is an isometric view of the cart of FIG. 2 with data collection devices in use.

In the contemplated embodiment, system 101 includes a computing device 103, which may be a mobile phone or other computer, wherein the computing device 103 includes a platform 109 thereon. The computing device 103 is configured to wirelessly communicate with one or more data collection devices 105, 107, to receive data therefrom. The one or more data collection devices 105, 107 will be carried and transported via a cart 201 (as shown in FIG. 3). Based on the data received, the platform 109 will provide a report 111 for the user. The report may include various information elements, such as locations of cracks, types of cracks, surface abrasions, or any other information that can be collected from a floor surface.

It should be appreciated that one of the unique features believed characteristic of the present invention is the cart 201. The cart 201 allows for easy maneuverability of the data collection devices along a floor surface, wherein the devices 105, 107 can collect data, such as data about crack locations or the like. This reduces the user efforts to collect said data for inspection reports or other floor surface reports.

Figure 2:
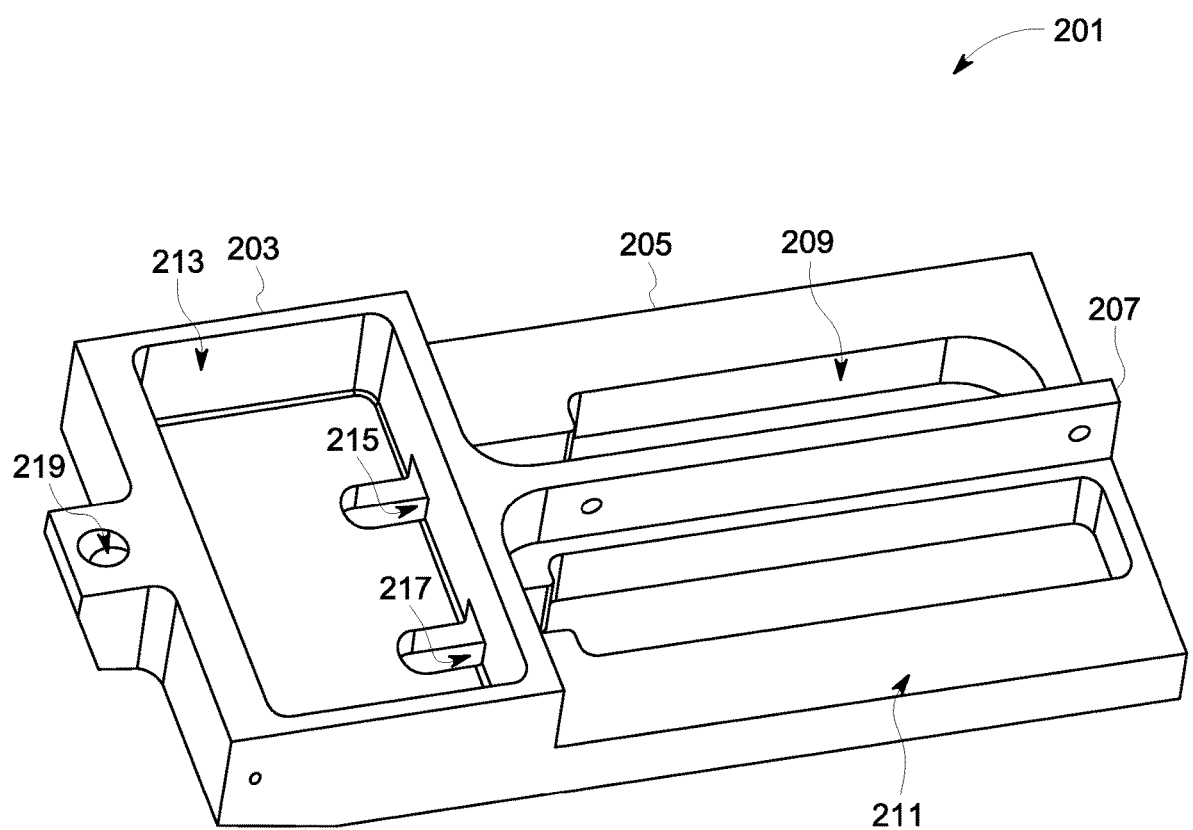
FIG. 2 is an isometric view of a cart for use with data collection devices in accordance with the present application.

In FIG. 2, the cart 201 is shown in detail. The cart 201 includes a body 203 which incorporates a data collection device transport platform 205. As shown, a first compartment 209 and second compartment 211 are cut through a thickness of the body such that the compartments will be open to the floor surface positioned underneath the cart. This feature allows for transport of the first and second data collection devices 107, 109 as shown in FIG. 3. It should be appreciated that the compartments can vary in size as needed. As shown, the cart may further include a barrier 207 that provides for structural support.

The cart can further include a third compartment 213 which is adjoined to the first and second compartments via a first channel 215 and a second channel 217. The channels allow for wires to extend between the first and second compartments and the third compartment as needed.

An opening 219 can allow for attachment of a handle 303 to the cart such that the cart can then be maneuvered along a floor surface. As further shown in system 301 in FIG. 3, one or more wheels 305 can be attached.

Figure 4:
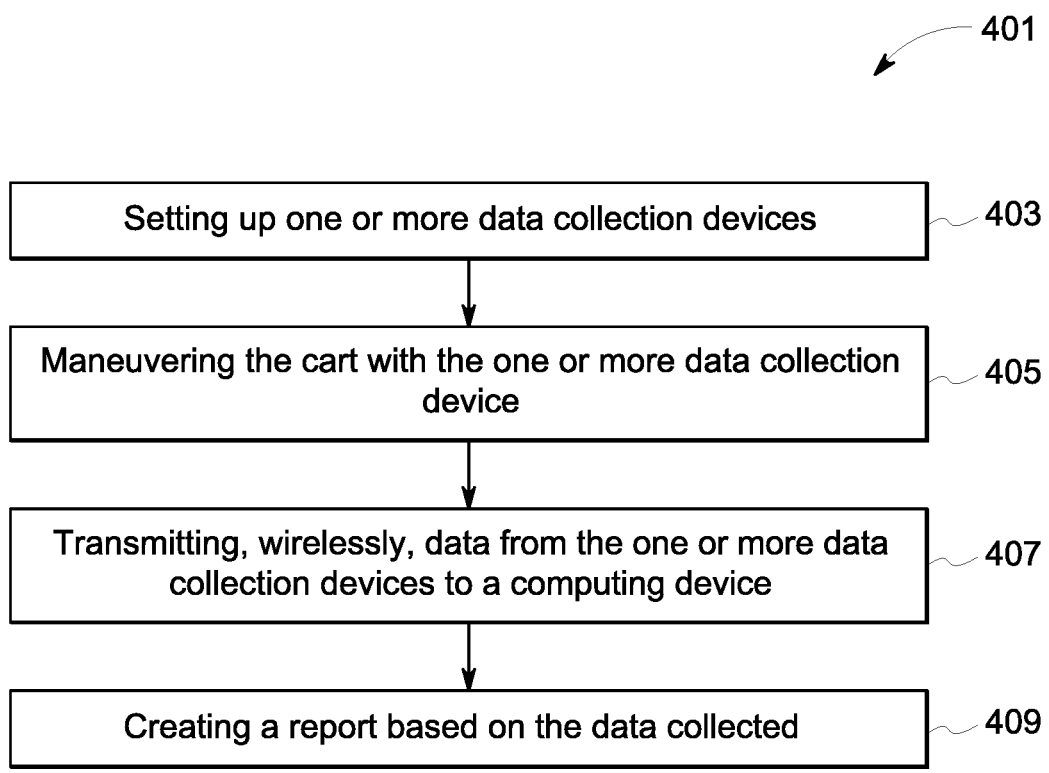
FIG. 4 is a flowchart of a method of use of the system of FIG. 1.

In FIG. 4, a flowchart 401 depicts a method of use of system 301. During use, the user will set up one or more data collection devices to wirelessly transmit data to a computing device, as shown with box 403. The user will then maneuver the cart with the one or more data collection devices along a floor, such that data is collected and transmitted, as shown with boxes 405, 407. As desired, a report can be created for use by the user, as shown with box 409.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A data collection system, comprising:
   a cart configured to carry one or more data collection devices, the cart having:
      a body with a top surface;
      a first compartment cut through a thickness of the body, the first compartment configured to receive a first data collection device;
      an opening to receive a handle, wherein the handle can be used to maneuver the cart; and
      a third compartment cut into the body of the cart; and
   a computing device in wireless communication with the first data collection device;
   wherein the computing device receives data from the first data collection device, the data related to a floor surface.

2. The system of claim 1, further comprising:
   a second compartment cut through a thickness of the body, the second compartment configured to receive a second data collection device.

3. The system of claim 1, further comprising:
   a report generated from a platform on the computing device, the report related to the data collected from the first data collection device.

4. The system of claim 1, further comprising:
   one or more wheels attached to the cart for rolling across the floor surface.

5. The system of claim 1, wherein the cart further comprises:
   a first open channel extending between the third compartment and the first compartment.

6. The system of claim 1, further comprising: the handle attached to the cart.

7. A cart for maneuvering data collection devices over a floor surface, the cart comprising:
   a body with a top surface;
   a first compartment cut through a thickness of the body, the first compartment configured to receive a first data collection device;
   an opening to receive a handle, wherein the handle can be used to maneuver the cart; and
   a third compartment cut into the body of the cart;
   wherein the cart is used to maneuver the first data collection device over the floor surface such that the first data collection device will collect data associated with the floor surface.

8. The cart of claim 7, further comprising:
   a second compartment cut through a thickness of the body, the second compartment configured to receive a second data collection device.

9. The cart of claim 7, further comprising:
   a first open channel extending between the third compartment and the first compartment.

* * * * *